Figure 1:
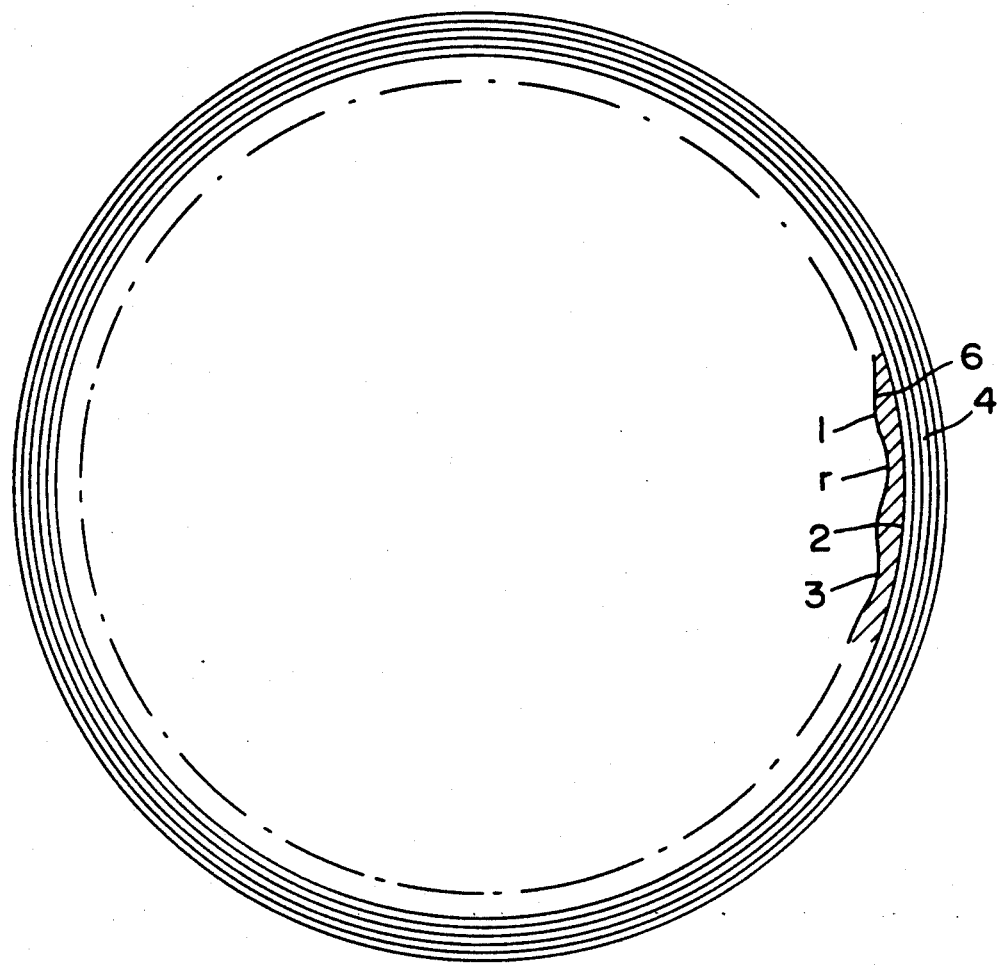

United States Patent
Oskarsson et al.

[11] Patent Number: 5,191,165
[45] Date of Patent: Mar. 2, 1993

[54] ORDNANCE BARRELS

[75] Inventors: Leif Oskarsson; Sigge Andersson; Bengt Pettersson, all Ljungby, Sweden

[73] Assignee: Statoil Europarts AB, Ljungby, Sweden

[21] Appl. No.: 769,258

[22] Filed: Oct. 1, 1991

[30] Foreign Application Priority Data

Oct. 1, 1990 [SE] Sweden .............................. 9003119

[51] Int. Cl.$^5$ .............................................. F41A 21/02
[52] U.S. Cl. ........................................... 89/15; 89/16; 156/173; 42/78
[58] Field of Search ................ 42/76.02, 78; 89/15, 89/16; 156/173, 175

[56] References Cited

U.S. PATENT DOCUMENTS

| 2,751,237 | 6/1956 | Conley ........................... 156/173 |
| 2,847,786 | 8/1958 | Hartley et al. ..................... 42/76 |
| 3,157,585 | 11/1964 | Durham ........................... 204/41 |
| 3,517,585 | 6/1970 | Slade ............................... 89/15 |
| 3,571,962 | 3/1971 | Eig .................................. 42/76 |
| 3,713,932 | 1/1973 | Butzow et al. ..................... 156/173 |
| 4,485,721 | 12/1984 | Shankhla et al. .................. 89/15 |

Primary Examiner—Stephen C. Bentley
Attorney, Agent, or Firm—Pollock, Vande Sande & Priddy

[57] ABSTRACT

The disclosure relates to a method of producing rifled, non-metallic barrels of composite material in the form of a fiber-reinforced thermosetting matrix for rocket and grenade launcher ordnance, and barrels produced in accordance therewith. The characterizing feature of the present invention is that this results in barrels with the same fiber content in both the lands of the barrel rifling and in its rifling grooves which has been realized in that a porous fluffy mat with a high capacity to absorb the matrix material is employed in the rifled portion of the barrel.

6 Claims, 1 Drawing Sheet

ORDNANCE BARRELS

TECHNICAL FIELD

The present invention relates to a method of producing rifled, non-metallic barrels for missile and shell ordnance, and barrels produced according to the method. The barrels according to the present invention are produced from a composite material of a known type, comprising reinforcement fibers of glass, carbon or suitable polymer material, for example polyamide, nylon or the like, baked into a matrix of a curable synthetic plastic material of, for instance, epoxy or ester plastic type.

BACKGROUND ART

Non-metallic barrels of fiber-reinforced thermosetting resin are primarily employed today for recoil-less weapons such as the rocket launcher or blow-back type which are equipped with single use disposable barrels. As far as we are aware, these barrels are always smooth-bored.

However, primarily in the patent literature, a number of different proposals have already been presented for methods of producing light, rifled barrels by encasing a thin-walled, interiorly rifled steel tube with a sufficiently thick outer layer of a fiber-reinforced thermosetting resin. However, the method is expensive, since the inner metal tube must be worked and rifled in the usual way and, moreover, it would probably be difficult to avoid problems caused by the different expansion coefficients of the metal tube and the surrounding outer reinforcing layer.

Moreover, there is at least one prior art proposal for a method of producing rifled, non-metallic barrels of a composite material of a corresponding type.

Thus, U.S. Pat. No. 4,485,721 describes a method of producing non-metallic, rifled, fiber-reinforced barrels on a rotary mandrel provided with a number of helically arranged grooves, the grooves being first completely filled with a "yarn" impregnated with a thermosetting plastic material, or ropes of carbon fiber which extend in the longitudinal direction of the grooves, whereafter an additional fiber material impregnated with a thermosetting plastic material is wound about the mandrel, either in the form of thread or textile material, until a tube of desired thickness has been attained, whereafter the plastic material, which, according to the above patent may for instance consist of an epoxy resin, is cured, the thus obtained tube being then removed from the mandrel. Concerning the grooves in the mandrel, which would thus provide the lands of the finished barrel, this patent discloses that these may preferably be substantially rectangular in cross-section.

If the method disclosed in the above patent functions satisfactorily, the thus obtained barrel would then have riflings of virtually rectangular cross-section, and display, on the one hand, a first axial reinforcement extending in the longitudinal direction of the lands, and, on the other hand, a substantially peripheral reinforcement.

SUMMARY OF THE INVENTION

The present invention now provides a simplified method for producing rifled, non-metallic barrels made of a composite material in the form of a thermosetting matrix such as a polyester or epoxy resin or other thermosetting synthetic resin or plastic, and one or more reinforcing fibrous materials of a known type, such as glass, carbon, polyacrylic or corresponding fibers.

According to the present invention, use is made, in a manner corresponding to that of the above-considered U.S. Patent, of a mandrel of substantially circular cross-section and provided with a plurality of preferably helically disposed longitudinal riflings, the mandrel having at least the same length as that of the desired ordnance barrel, and its outer diameter dimension having, at the curing temperature of the thermosetting matrix employed, an outer dimension which corresponds to the inner dimension of the desired barrel, while, at the same temperature, its rifling grooves correspond to the lands of the desired barrel located between the grooves, this mandrel being coated with a continuous fluffy mat produced from a fiber material and possessing a great capacity to absorb the matrix material (the resin) in its uncured or prepolymer phase, and with which the mat is drenched, whereafter the mat is, in its turn, surrounded by a plurality of resin-drenched fiber layers which are disposed peripherally about the mandrel and are in the form of tow and/or perhaps primarily of linear lengths of fiber wound on helically at varying angles and/or wound on tangentially more or less at right angles to the axis of the mandrel. An essential feature of the method according to the present invention is that these fiber layers are applied under sufficient compression and/or fiber stretching, and that the mat contains a sufficient quantity of matrix or resin in order that the applied mat and matrix or resin absorbed therein completely to fill the rifling grooves provided in the mandrel. Hence, this results in the mat being compressed over the lands between the rifling grooves of the mandrel, while having full thickness in the rifling grooves, at the same time as surplus resin and air are pressed out of the mat.

Thereafter, additional layers are applied in accordance with prior art technology until the tube achieves the desired wall thickness. Thereafter, the matrix is cured and the barrel removed from the mandrel.

In order that the resin and mat penetrate down and wholly fill-out the rifling grooves in the mandrel, it is desirable that these display smooth transitions to the lands, and we have now surprisingly found that, in trial shoots, we have obtained a desired rotation of the projectile with helical riflings with sinusoidal cross-sectional configuration.

Thus, this is the most advantageous profile cross-section according to the present invention of the lands and grooves of both the mandrel and the finished barrel.

The desired durability of the rifling grooves is obtained by first, before the mat is applied, surrounding the mandrel with a glass fiber fabric impregnated with the resin matrix which thus may follow the contours of the rifling grooves, and only then surrounding the mandrel with the contemplated mat in accordance with the foregoing. Trial firings have been carried out using barrels produced in accordance with the above-described method, these trials demonstrating that such barrels may be employed for discharging shells provided with driving bands of both metal and plastic.

Since the lands and rifling grooves of the mandrel are helical in configuration, the projectiles will execute a rotary movement even outside the barrel, whereby it will be possible to discharge the projectile without the use of guide fins.

In the barrel which we have trial fired, the inner wear layer consisted of a plain woven glass fiber fabric of a thickness of 0.10 mm and grammage of 70 g/m², while the mat forming the rifling grooves and lands was of non-woven type and consisted of polyacrylic fibers having a weight of 60 g/m². The plastic matrix was of epoxy type.

The present invention has been defined in the appended claims, and accompanying

Figure 2:
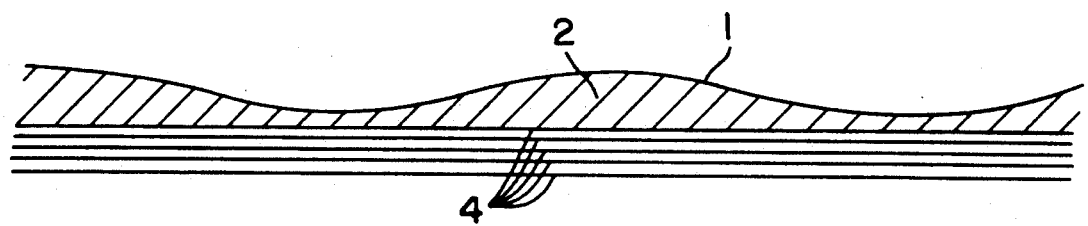

FIG. 1 shows a cross-section through a finished barrel of the type obtained in accordance with the present invention, while FIG. 2 shows the inner, sinusoidal cross sectional profile of the barrel in the folded-out state.

In FIG. 1, reference No. 1 relates to the inner glass fiber layer, reference No. 2 to the mat forming the land (b) filled with the cured plastic material, while it is possible to see, at the rifling grooves (r) how, at reference No. 3, the mat has been compressed to a minimum of its largest thickness. In addition, the barrel according to the present invention includes a number of layers of plastic-impregnated glass fibre thread winding 4 which provide the thickness of the barrel. The length of the sinusoidal cross-sectional profile may be varied within the fundamentals of the present invention, in accordance with tests and depending on the calibre of the barrel.

The present invention should not be considered as restricted to that described above and shown on the Drawings, many modifications being conceivable without departing from the spirit and scope of the appended claims.

What we claim and desire to secure by Letters Patent is:

1. A method of producing for use as a rocket launcher or grenade launcher ordnance a rifled, non-metallic barrel, having, in cross section, lands alternating with grooves with smooth transitions therebetween, said barrel being made from a composite material comprising a thermosetting matrix material and reinforcing fibers, said method comprising:

providing a rifled mandrel having a length at least as great as the length of the desired barrel, and an outer diameter which corresponds to the inner diameter of the desired barrel, said rifled mandrel having a substantially circular cross section, with longitudinal rifling grooves alternating with longitudinal rifling lands with smooth transitions therebetween, said lands and grooves corresponding to the grooves and lands respectively for the rifling of the desired barrel;

surrounding said rifled mandrel with a continuous, porous, fluffy mat formed of a fibrous material, said mat being capable of absorbing said matrix material in its uncured or prepolymer state, and being drenched with said matrix material;

thereafter surrounding the mat with a plurality of fiber layers drenched with matrix material, so as to dispose said layers peripherally about the mandrel;

applying said fiber layers against said fluffy mat with the matrix material absorbed therein to compress said mat and to fill the rifling grooves of the mandrel, the mat and its content of matrix material being thereby compressed to a smaller thickness above the lands than above the grooves of the mandrel, with the thicker parts thereof penetrating into said rifling grooves, at the same time forcing out surplus matrix material and entrapped air;

continuing the application of additional drenched fiber layers until the barrel wall has reached a desired thickness;

curing the matrix material; and removing the resulting barrel from the mandrel.

2. The method as claimed in claim 1 wherein a porous, matrix material-drenched, polyacrylic fiber mat of a non-woven type is provided for surrounding said mandrel and forming the lands of the barrel.

3. The method as claimed in claim 1, wherein the mandrel has at least weakly helical, continuous rifling grooves and intermediate rifling lands, the sequence of grooves and lands defining a sinusoidal cross-sectional profile.

4. The method as claimed in claim 1, further comprising the step of covering the mandrel, prior to the application of the porous, fluffy mat, with a matrix material-impregnated, reinforcing fabric, which follows the contour of the mandrel for imparting an inner durability to the finished barrel.

5. A non-metallic rifled barrel formed from a thermosetting matrix and a reinforcing fiber material, said barrel having rifling grooves and lands located therebetween, said barrel comprising:

a wear-resistant inner layer comprising a thermosetting matrix reinforced with glass fibers;

an intermediate layer covering said inner layer and comprising a fiber mat substantially completely filled with matrix material, said fiber mat being compressed at said grooves to a thickness less than the thickness at said lands, the sequence of lands and grooves showing a sinusoidal cross-sectional profile; and an outer layer covering said intermediate layer, said outer layer comprising a plurality of layers of fibers helically wound about said intermediate layer and impregnated with matrix material.

6. The non-metallic barrel as claimed in claim 5, in which said thermosetting matrix is an epoxy resin, and said reinforcing fiber material comprises carbon fibers.

* * * * *